United States Patent Office 3,605,346
Patented Sept. 20, 1971

3,605,346
METHOD OF ABRASIVE TREATMENT OF SURFACES OF BEARING RACES MADE OF HARDENED STEEL
Alexandr Ivanovich Sprishevsky, Sharikopodshipnikovskaya ul. 32, kv. 30, Moscow, U.S.S.R; and Sergei Georgievich Redko, Naberezhnaya kosmonavtov 2, kv. 19; Venlamin Dmitrievich Gundorin, Nagorny proezd 2/1, kv. 20; and Jury Vladimirovich Dubrovsky, Ulitsa Sovetskaya 23, kv. 11, all of Saratov, U.S.S.R.
Filed Aug. 28, 1968, Ser. No. 756,049
Int. Cl. B24b 1/00
U.S. Cl. 51—290          1 Claim

ABSTRACT OF THE DISCLOSURE

An abrasive tool in the form of radially adjustable bars is advanced in a longitudinal direction, at a speed of between 1 and 10 m./min., in advance and withdrawal strokes to machine a bearing race which is rotated at a peripheral speed of 180–200 m./min. The tool undergoes transverse movement, after each double stroke, in an amount of 5–10 μm. per longitudinal stroke of the tool.

---

This invention relates to methods of abrasive treatment of the surfaces of bearing races made of hardened steel.

Abrasive treatment of bearing races is performed by the conventionally known method of grinding which is characterized by the employment of rotary motion of the cutting tool and the movement of a workpiece and tool in relation to each other. Abrasive wheels are used as cutting tools.

When machining hardened steels, the peripheral speed of the grinding wheel reaches 30–70 m./sec.

The thickness of the removed metal layers reaches 0.1–0.5 mm. per initial size.

According to the conventionally known method, the tool and workpiece are rigidly fixed in respective stocks of the machine.

The conventionally known method of grinding possesses a number of disadvantages which materially impair the accuracy and quality of the ground surfaces of bearing races.

Among these disadvantages are considerable deviations of the ground surfaces from a correct shape and the presence of thermal defects on the ground surface (changed structure of the surface layer, warping of the ground surface, burns, grinding fissures, etc.).

Great difficulties are encountered in machining small-diameter holes (below 30 mm.) because the machining of such workpieces calls for the employment of a high-speed drive (up to 100,000 r.p.m.), while the limited size of the grinding wheel and the flexibility of the spindle greatly hamper the production of finished parts possessing a high degree of accuracy.

An object of the invention is to provide a method of abrasive treatment of the surfaces of bearing races made of hardened steel which will ensure the production of surfaces having negligible deviations from a correct shape.

Another object of the invention is to provide a method which will ensure the production of bearing races without thermal defects on the machined surface.

One more object of the invention is to provide a method which will ensure efficient machining of bearing races with small diameter holes.

The above-mentioned and other objects of the invention are achieved by the provision of a method of abrasive treatment, according to which an abrasive tool having the shape of radially adjustable bars, and the bearing race being machined, both secured in respective stocks of the machine, are set in rotation in relation to each other with a peripheral speed of 180–200 m./min., and in longitudinal movement with a speed of 1–10 m./min.

Figure 1:
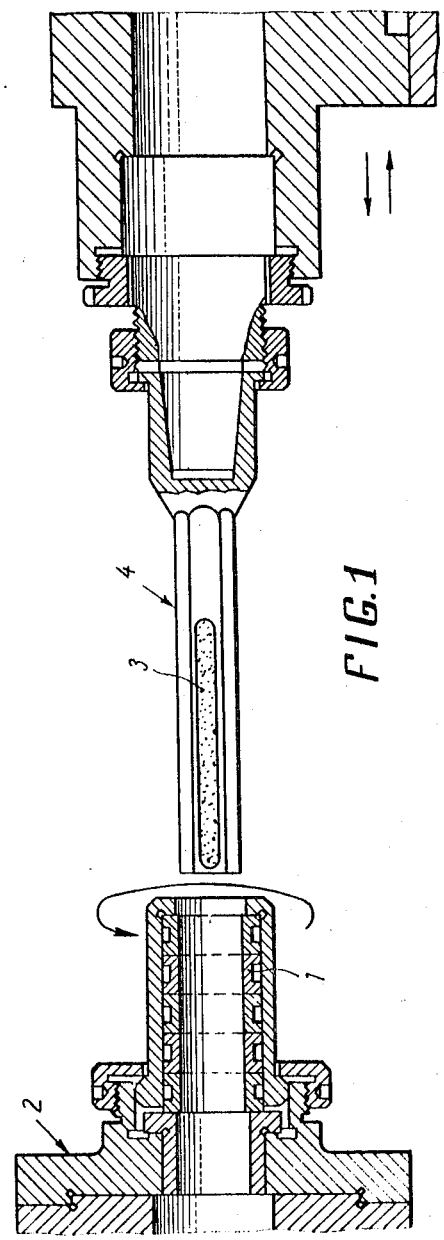
Figure 2:
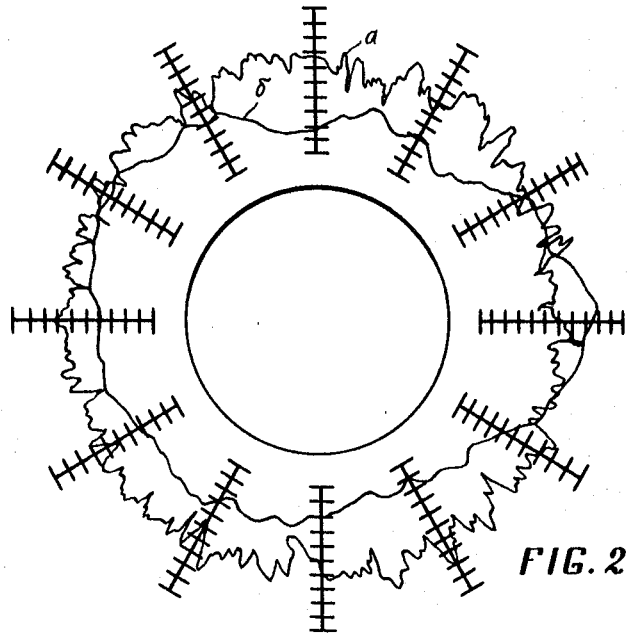
Figure 3:
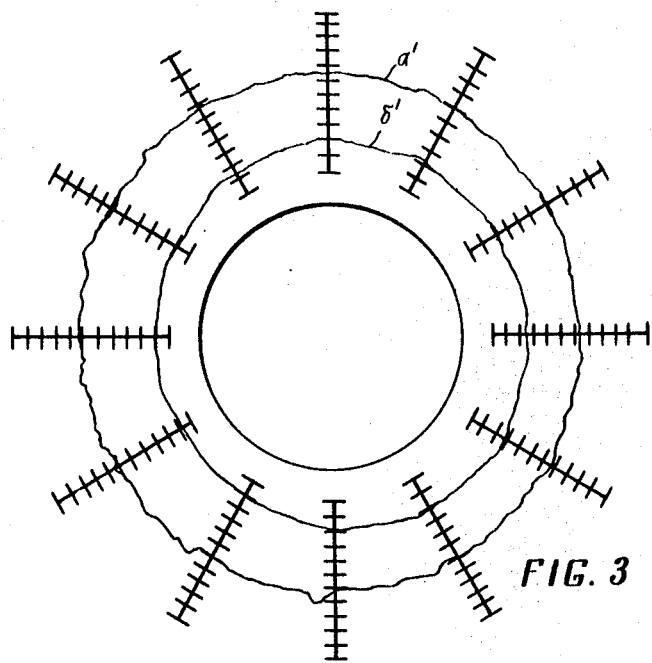

The invention is further described with reference to the accompanying drawings, in which:

FIG. 1 diagrammatically shows in cross-section a machine for the abrasive treatment of surfaces according to the invention;

FIG. 2 is a diagram which shows a deviation of the hole cross-section after machining by conventionally known methods; and FIG. 3 is a diagram which shows a deviation of the hole cross-section after machining by the new method according to the invention.

The proposed method of abrasive treatment of surfaces of bearing races made of hardened steel consists in that a bearing race 1 (FIG. 1) or a set of 10 to 12 rings (in FIG. 1 five rings are shown) is secured in a fixture 2 of the grinding machine and is rotated with a peripheral speed of 150–200 m./min.

The grinding tool used in accordance with the new method has the shape of one or more bars 3 (FIG. 1) which, when machining cylindrical or tapered surfaces, are arranged in diametrically opposite relation. The tool 4 secured in the spindle of the machine is set in longitudinal motion with a speed of 1–10 m./min. After each double stroke (advance and withdrawal) the bar 3 is shifted in the transverse direction which corresponds to a radial feed of 5–10 μm. per longitudinal stroke of the tool.

The number of longitudinal strokes depends upon the thickness of the metal to be removed. For example, in order to remove a metal layer of 0.05 mm., from 5 to 10 longitudinal strokes will be required.

Since the cutting speeds in the specified method are comparatively low, the temperature of the workpiece surface in the zone of cutting does not rise above 250° C. At this temperature no changes of metal structure take place in the surface layer, as it normally occurs when resorting to the conventionally known method of grinding.

The same principle is applicable to the machining of the external and side surfaces of the bearing races.

Given below is an example of machining holes in workpieces made of chrome-carbon steel, of the diameter of 30$^{-0.01}$ mm. The holes have been machined with 4 bars made of corundum of electric-grinding grade, grain size 25 μm., with a ceramic binder. Two bearing races have been machined at a time, the hardness of the races being $HR_c$ 61–63. The thickness of the ground-off metal layer has been 0.3 mm. per diameter.

The lubricating and cooling fluid which has been used in this instance is a mixture of kerosene with spindle oil (50% of each). The best results have been obtained at the workpiece peripheral speed of 180 m./min., grinding bar longitudinal feed speed of 3 m./min., and grinding bar radial feed of 8 μm. per each longitudinal stroke of the grinding bar.

The time spent on the machining of two workpieces has been 30–45 sec.

Tests have shown that the herein proposed method of surface treatment eliminates the disadvantages characteristic of the conventionally known method of grinding, and ensures the provision of surfaces having a high degree of accuracy and a perfect surface finish.

For example, when using the conventionally known grinding method (FIG. 2) the height of the corrugations (curve $a$) amounts to 1.5 μm. and the out-of-round (curve "δ") is 0.6 μm. When using the proposed grinding method (FIG. 3), the height of the corrugations (curve $a'$) is 0.2 μm., and out-of-round (curve $\delta'$) is 0.1 μm.

As regards the finish of the ground surfaces, the following results have been obtained. The roughness of the surface corresponds to the 8th or 9th class ($R_a = 0.4$–0.25) μm.) The surfaces machined by the method described herein have no traces of burns or grinding fissures, while the surface layer is free of any changes of the metal structure.

What we claim is:

1. A method for the abrasive treatment of the surfaces of bearing races made of hardened steel, said method comprising securing the races in a spindle and giving the same a rotary motion at a peripheral speed of 150–200 m./min., mounting abrasive bars to be radially displaceable relative to said races after each reciprocable stroke with respect thereto and reciprocating the bars at a speed of 1–10 m./min. relative to the races, the bars being fixed against rotation.

References Cited

UNITED STATES PATENTS

| | | | |
|---|---|---|---|
| 1,879,110 | 9/1932 | Cramer | 51—291X |
| 2,108,029 | 2/1938 | Connor | 51—290 |
| 2,139,896 | 12/1938 | Johnson | 51—67 |
| 2,195,047 | 3/1940 | Wallace | 51—67 |
| 2,195,052 | 3/1940 | Wallace | 51—34 |
| 2,244,806 | 6/1941 | Schmidt | 51—67 |
| 2,354,347 | 7/1944 | Peets | 51—67 |

OTHER REFERENCES

Publication, The Story of Superfinish by Arthur M. Swigert, Jr., 1940, p. 270.

LESTER M. SWINGLE, Primary Examiner